C. F. SPENCER.
Preserve Jar.
No. 2,242. Reissued May 15, 1866.
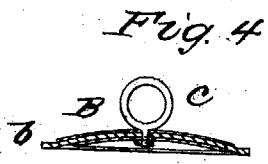
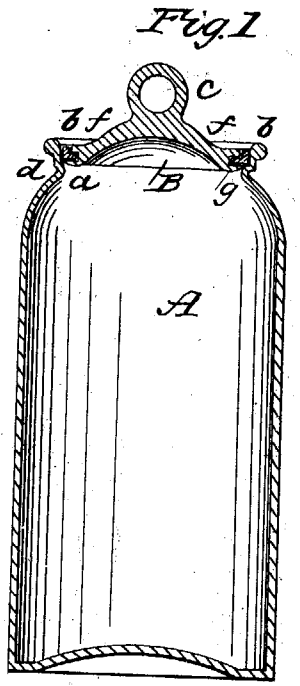
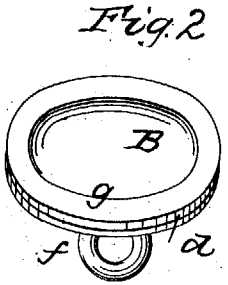
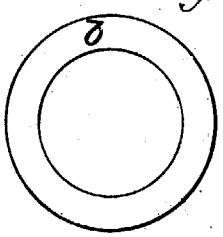
WITNESSES
J. Fraser
R. F. Osgood
INVENTOR
Chas F. Spencer
N. PETERS, Photo-Lithographer, Washington, D. C.

UNITED STATES PATENT OFFICE.

R. A. BUNNEL, OF ROCHESTER, NEW YORK, ASSIGNEE OF CHAS. F. SPENCER.

IMPROVED PRESERVE-JAR.

Specification forming part of Letters Patent No. 37,647, dated February 10, 1863; Reissue No. 2,242, dated May 15, 1866.

*To all whom it may concern:*

Be it known that CHARLES F. SPENCER, of Rochester, in the county of Monroe and State of New York, has invented a new and useful Improvement in Self-Sealing Preserve-Jars; and I do hereby declare that the following is a full and exact description thereof, reference being had to the accompanying drawings, making part of this specification.

Figure 1 is a central longitudinal vertical section of this improved jar; Fig. 2, a perspective view of the cover inverted and with the packing-ring detached; Fig. 3, a plan of the packing-ring detached from the cover; Fig. 4, a modification of the stopper in section.

Like letters designate corresponding parts in all the figures.

This invention consists in the construction and arrangement of the stopper, which is provided with a strip of rubber or other suitable packing, forming a ring or band that projects sufficiently beyond the edge of the cover both ways to pack tightly between it and the neck of the jar, and in a suitable seat provided within the mouth of the jar, in combination with the stopper, as hereinafter described.

The jar A may be of ordinary form, as represented, and made of glass, tin, or any other suitable material. It is provided at its top with an open mouth of suitable size, the neck of which is preferably made slightly flaring, so that the stopper will pack more tightly as it is driven in, and it is also provided with a suitable seat or shoulder, *a*, at the proper potion within the neck for the stopper to rest on when in place. The stopper is intended to be inserted in and removed from the mouth of the jar, similarly to the ordinary stopper of a bottle, and to pack the joint so tightly as to hermetically inclose the contents of the jar under all conditions. To this end it is composed of two parts, the cover B proper and a ring, *b*, of india-rubber or other equivalent material, secured thereto. The cover B is made in a single piece, and preferably of porcelain, glass, or earthenware, so as to resist the action of the acids of the fruit inclosed, though, if desirable, it may be made of metal or other material. It is provided at the top with a suitable ring or knob, *c*, for easily inserting and removing it. In the outer edge or periphery of the cover it is best to make a groove or channel, *d*, of considerable depth and extending entirely around the circumference, as represented in Figs. 1 and 2, and into this groove is fitted the packing-ring *b*, Figs. 1 and 3, of such size that it will fill the groove closely by its elasticity, and project at the same time considerably beyond the edge of the cover, so as to furnish sufficient surface for the packing. The cover B thus provided with the groove *d* in its periphery has two flanges or rims at its edge, one above and the other below the joining of the rubber. The diameter of the flange *f* above is a little less than the diameter of the mouth of the jar in which the stopper fits, so as to leave sufficient space for the thickness of the rubber which serves as the packing, while the diameter of the flange *g* below is a little less than that of the opening in the seat *a* of the jar, so that it will not strike thereon as it is pressed down, but still fill the whole space, so as to shut off the rubber as much as possible from the fruit below. Thus arranged, when the stopper is inserted in place the projection of the rubber outside of the flange *f* is compressed against the neck of the jar so tightly as to exclude the ingress of air, and turns up into the position shown in Fig. 1, furnishing a broad bearing against the neck of the jar, being always sustained in place by the said flange. This broad bearing furnishes a secure packing under all conditions, so that the jar may be moved or transported with safety.

The advantage of a cover made in a single piece with the packing secured to it as described is apparent.

The device is exceedingly cheap, and its simplicity is such that it cannot become disarranged or inoperative. It is readily molded or cast, and when thus formed is perfectly tight, having no joints through which air may find ingress, as is the case where it is composed of several parts that have to be joined together, and it requires no fitting, as in such cases. The rubber is easily applied by stretching it over the edge, and when in position fills the groove closely. The flange *g* of the cover, by filling the space inclosed by the seat or shoulder of the jar, effectually and entirely excludes the rubber from contact with the fruit, by which the taste of the latter might be affected or the vitality of the packing injured.

By being made in a single piece the cover is not liable to become strained by removal from the jar, so as to open the joints, as is frequently the case in other devices. A stopper thus constructed will last for many years.

Fig. 4 shows a modification of the stopper, in which an entire disk of rubber is used secured between two disks of metal plate suitably secured together.

What I claim as the invention of CHARLES F. SPENCER, and desire to secure by Letters Patent, is—

1. A cover or stopper with a packing around its edge or periphery, in combination with a jar or can whose mouth or neck has a cylindrical or slightly flaring inner surface and an inwardly-projecting shoulder or seat below.

2. A self-retained cover or stopper with a packing which projects above and below its edge, so as to be impressed between the same and the mouth or neck of the jar or can.

3. The combination of a jar or can which has an inwardly-projecting shoulder in the mouth or neck thereof with a cover or stopper whose packing packs both against the said shoulder and against the inner periphery of the neck.

4. A packing-ring one edge of which is bent inward and held in a peripheral groove of the stopper or cover.

5. A cover or stopper which has an edge or flange below the packing nearly fitting within and in combination with shoulder in the neck of the jar or can.

6. The combined arrangement and construction of the double-flanged cover B, packing-ring *b*, and jar, neck-seat *a*, one flange, *f*, of the cover compressing and tightening the packing-ring, and the other flange, *g*, nearly fitting and closing the circle within the seat, substantially as and for the purposes herein specified.

In witness whereof I have hereunto set my hand this 18th day of April, 1866.

R. A. BUNNEL.

Witnesses:
S. COLEMAN,
P. I. CLUM.